June 28, 1938.  M. H. THODE  2,122,120
ANTIGLARE SHIELD MOUNTING AND OPERATING MEANS THEREFOR
Filed May 11, 1937   3 Sheets-Sheet 1

Inventor
Martin H. Thode

By Clarence A. O'Brien
Hyman Berman
Attorneys

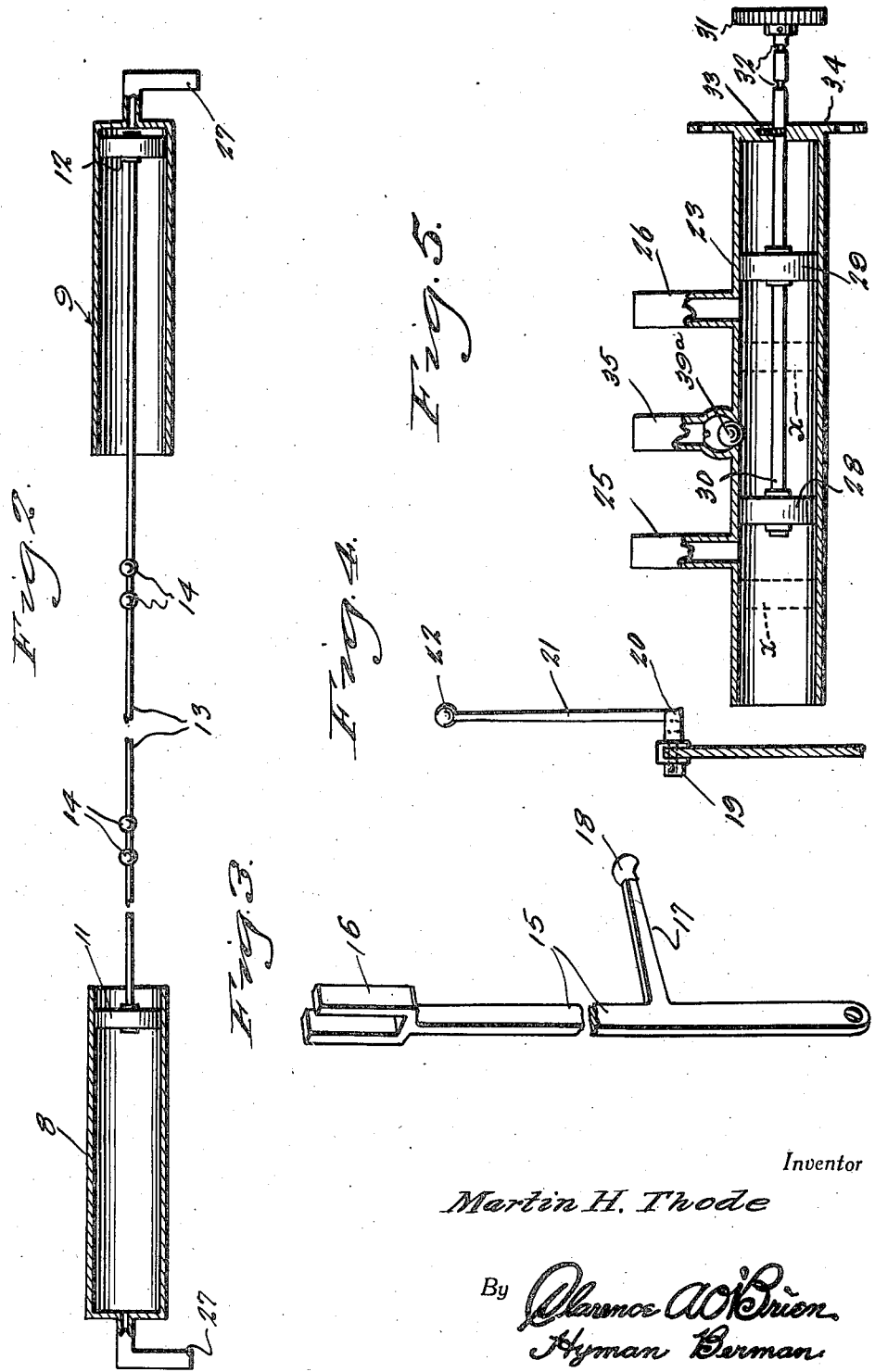

June 28, 1938.  M. H. THODE  2,122,120
ANTIGLARE SHIELD MOUNTING AND OPERATING MEANS THEREFOR
Filed May 11, 1937  3 Sheets-Sheet 3
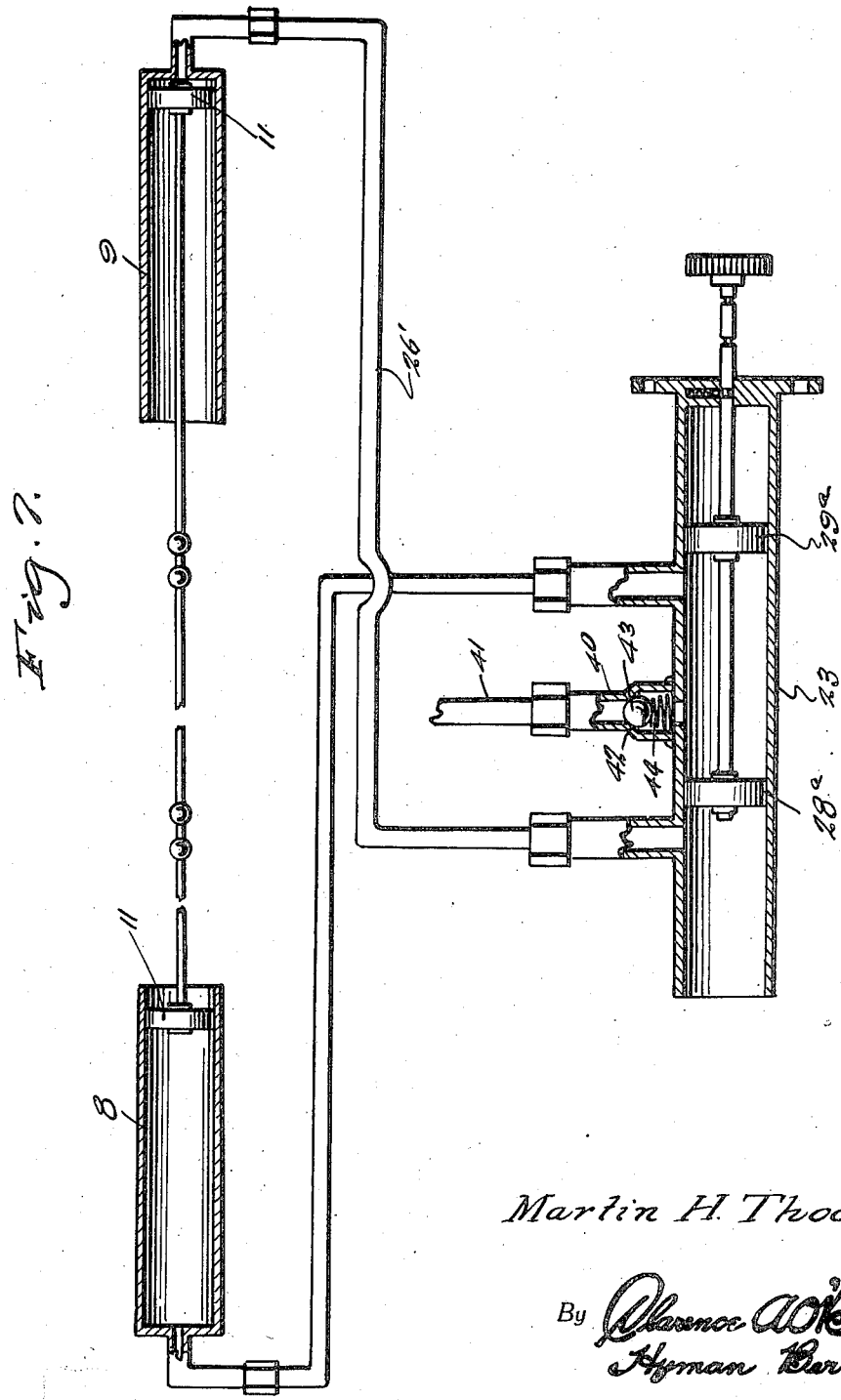
Inventor
Martin H. Thode
By Clarence A. O'Brien
Hyman Berman
Attorneys Patented June 28, 1938

2,122,120

UNITED STATES PATENT OFFICE 2,122,120

ANTIGLARE SHIELD MOUNTING AND OPERATING MEANS THEREFOR

Martin H. Thode, Guler, Wash.

Application May 11, 1937, Serial No. 142,013

1 Claim. (Cl. 296—97)

This invention relates to anti-glare shields of the type designed for use on automobiles to shield the eyes of the operator from the glare of the sun during the day, and from the glare from lights of approaching vehicles in the evening.

An object of the present invention is to provide an improved mounting means for anti-glare shields of the character mentioned.

A further object of the invention is to provide as a part of said mounting means improved means whereby either vacuum or pressure may be used for swinging the shield into and out of operative position and for holding the shield in either of said positions.

The invention together with its objects and advantages will be best understood from a study of the following description taken in connection with the accompanying drawings wherein:

Figure 2 is an enlarged fragmentary longitudinal sectional view through a pair of cylinders and associated members forming part of the invention.

Figure 3 is a perspective view of a lever.

Figure 4 is a fragmentary sectional view through an anti-glare shield having an operating arm associated therewith in accordance with the present invention.

Figure 5 is a longitudinal sectional view through a valve assembly particularly designed for controlling the movement of the anti-glare shield to either of two positions through the medium of vacuum.

Figure 7 is a somewhat diagrammatic view with certain parts shown in elevation and other parts shown in section and illustrating an arrangement for controlling the visors by pressure.

Figure 1:
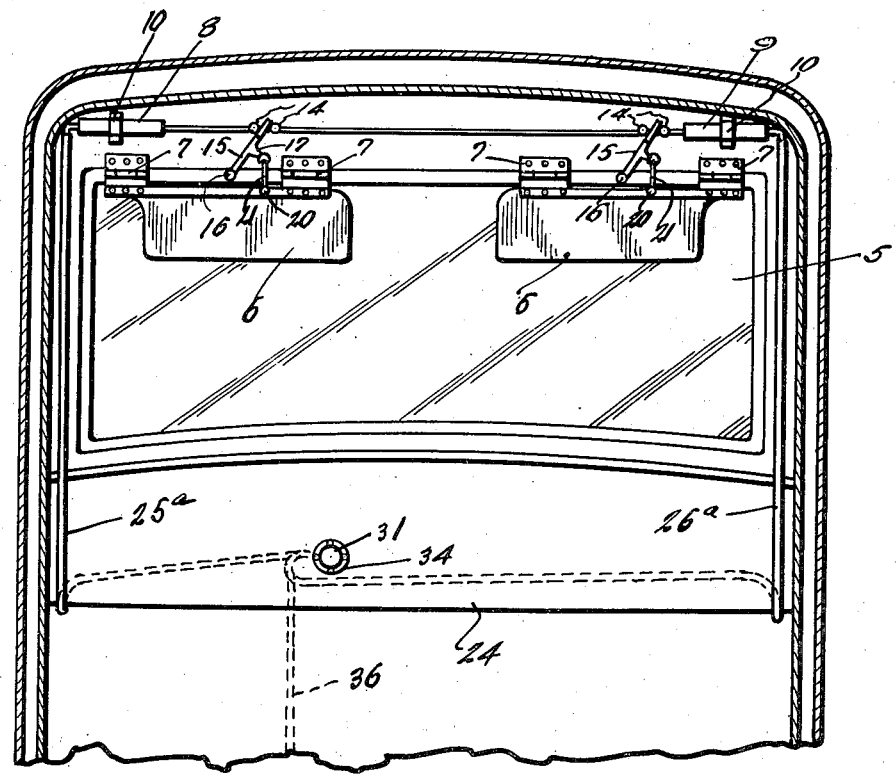
Figure 1 is an enlarged fragmentary vertical sectional view through an automobile body illustrating the application of my invention thereto.

Referring to the drawing by reference numeral it will be seen that 5 indicates generally a conventional automobile windshield; and that in accordance with the present invention there is provided for the windshield 6 a pair of sun visors or anti-glare shields 6.

Each glare-shield 6 is swingably mounted adjacent the upper edge of the windshield 5 through the medium of a pair of hinges 7—7.

Whether vacuum or pressure be used for swinging the shields 6 into and out of operative position relative to the windshield 5 there is provided a pair of cylinders 8—9 mounted above the upper edge of the windshield and secured in position through the medium of bracket 10. Pistons 11, 12, have a working fit within the respective cylinders 8 and 9 and are connected together through the medium of a single rod 13.

For each anti-glare shield 6 there is provided on a rod 13 a pair of relatively spaced, in the present instance, ball like projections 14.

Also for each glare shield 6 there is provided a lever arm 15 that is pivoted at one end to the upper part of the frame of the wind shield 5 as at 16, and at a relatively opposite end with a fork 16 that straddles the rod 13 between a pair of projections 14 so that movement of the rod 13 will be transmitted to the lever arm 15.

Each lever arm 15 is provided with a lateral projection 17 that at its end terminates in a socket 18.

Each glare shield 6 is provided at its upper edge with an opening to receive a pin 19 one end of which is bifurcated and has pivoted within the furcation as at 20 one end of an arm or link member 21. At the free end thereof link member 21 is provided with a ball 22 engaging the socket 18 so that movement of the lever 15 is transmitted to the glare shield 6 for swinging the latter to either the two positions referred to, that is either to a position shown in Fig. 1 for protecting the eyes of the operator or other occupants of the vehicle from the glare of the sun or the light of oncoming vehicles or to a position substantially at right angles to that shown in Fig. 1 when there is no need to use the anti-glare shield.

For swinging the shields 6 to either of the positions mentioned by vacuum created incidental to the running operation of the internal combustion engine of the automobile may be utilized for actuating pistons 11, 12 there is provided a control valve assembly adapted to be interposed in a line connecting the intake manifold 39 of the internal combustion engine with each of the cylinders 8 and 9. This control valve assembly includes a cylinder 23 that is suitably mounted on the instrument board 24 of the automobile and is provided at spaced point thereon with integral nipples 25, 26 that are connected respectively with the closed ends 12 of the cylinders 8, 9 through the medium of suitable conduits 25a, 26a, the cylinders 8, 9, as shown in Fig. 2, being provided at the respective closed ends thereof with nipples 27 onto which one end of said referred to conduits are sleeved.

Operating within the cylinder 23 are a pair of piston valves 28, 29 that are secured to a single operating rod 30, one end of said rod projecting outwardly from the instrument board 24 and being equipped with a knob 31 whereby the rod may be easily manipulated, manually.

To secure the piston valve 28, 29 either in the full line position shown in Fig. 5 or in either of the dotted line positions also suggested in said Fig. 5, the knob equipped end of rod 33 is provided with a series of spaced grooves 32 with a selected one of which is engageable a spring pressed element 33 provided in the closed and flange equipped end 34 of cylinder 23.

In connection with the above, it will be noted that the flange at the end 34 of the cylinder 23 is suitably apertured whereby through the medium of suitable fastening elements the flanged end of cylinder 23 may be secured to the instrument board 24 at the inner side of the latter to extend forwardly therefrom.

Intermediate the nipples 25, 26 there extends from the valve cylinder 23 a nipple 35 which is connected through the medium of a suitable conduit 36 with a fitting 37 interposed in the vacuum conduit 38 that leads from the intake throat of the intake manifold 39 of the internal combustion engine to the vacuum motor of a windshield wiper or the like.

Operating with the inner end of the nipple 35 is a downwardly seating ball check valve 39a.

In Fig. 1 the sun visors or anti-glare shields 6 are in their lowered operative position relative to the windshield 5. Assuming that it is desired to swing the glare shields 6 upwardly to an out-of-the-way position, the operator pushes inwardly on the rod 30 for positioning the valve piston 28, 29 in the dotted line position indicated at X in Fig. 5. With the piston valves 28, 29 in this position vacuum will be created in the line 25a connecting the cylinder 23 with the cylinder 8 so that the piston 11 in the last mentioned cylinder, in response to said vacuum, will, together with the piston 12, move from the position shown in Fig. 2 toward the left. This will cause the arm 15 to swing in a counterclockwise direction and the swinging movement of the arm 15 will be transmitted, in an obvious manner, to the shield 6 for swinging the latter upwardly and to an out-of-the-way position relative to the windshield 5.

In connection with the above, it will be appreciated that the vacuum created in the line 38 will tend to unseat the ball check valve 39a so that the vacuum resulting in the line 25 will draw the piston 11 and associated parts to the left in Fig. 2 to raise the glare shield. When the motor stops, relieving the vacuum in the line 36, ball check valve 39a will immediately seat itself for maintaining the vacuum in the cylinder 8 and consequently said vacuum will be utilized for maintaining the glare shield in raised position. The maintenance of the vacuum in the cylinder 8 in this manner and after the motor has stopped will ensure the retention of the glare shield in raised position against the tendency thereof, by their own weight, to swing downwardly to a vertical position.

When it is desired to lower the shields 6 to the position shown in Fig. 1, which is the opposite position of the shield, the operator pulls outwardly on the rod 30 to position the valve 28, 29 as shown in full line in Fig. 5, with the result that the vacuum will then be created in line 26a so that the piston 12 will act in response to vacuum and will, with piston 11, move to the position shown in Fig. 2, thus causing the arms 15 to swing in a clockwise direction. This movement of the arms 15 is transmitted to the shields 6 forcing the latter to swing from the up-and-out-of-the-way position down to the operative position shown in Fig. 1.

In Fig. 7 is illustrated an arrangement whereby pressure, such as air under pressure, and from a suitable source of supply, may be utilized for swinging the glare shields or visors into an out of operative position relative to the windshield 5.

Figure 6:
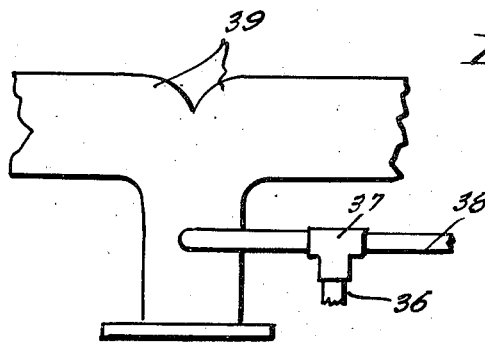
Figure 6 is a detail elevational view showing a vacuum conduit attached to the intake throat of the intake manifold of an internal combustion engine.

Thus in Figs. 6 and 7 it will be seen that the arrangement is substantially the same as that described with respect to the arrangement for operating the glare-shields 6 through the medium of vacuum with the exception that the intermediate nipple associated with the valve cylinder 23, and in this second form of the invention, indicated by the reference numeral 40 is connected with a conduit 41 leading from a suitable source of pressure supply. Further the nipple 40 intermediate its end is formed to provide internally thereof a valve seat 42 against which an upwardly seating ball check valve 43 is normally urged to seat through the medium of a coil spring or the like 44.

The operation of the device in response to pressure is believed to be obvious, and in Fig. 7 the parts are shown in the position occupied thereby when the visors 6 are in the lowered position shown in Fig. 1. Thus it will be seen that when it is desired to raise the visors 6 to an out-of-the-way position the pistons 28a, 29a, are moved to a position corresponding to the dotted line position of the pistons indicated by the reference character X in Fig. 5 so that air or the like under pressure will act to unseat the valve 43 permitting this air under pressure to pass into the cylinder 23 and through the line 26' into the cylinder 9 for moving pistons 11 and 12 in Fig. 7 to the left of said figure thereby causing the visors 6 to swing upwardly to an out-of-the-way position. When this has been accomplished and the flow of pressure through the line 41 has been cut off valve 43 will immediately seat to retain sufficient pressure in the line 26' and the cylinder 9 to insure the retention of the glare shields in raised position against the tendency thereof, by their own weight, to swing downwardly to a vertical position.

It is thought that a clear understanding of the construction, utility and advantages of an invention of this character will be had without a more detailed description; and while I have herein shown and illustrated preferred embodiments of the invention, it is to be understood that it is nowise intended to restrict the invention to the precise detailed construction, combination and arrangement of elements as herein illustrated, other than may be required by the prior art or scope of the appended claim.

What is claimed is:

An operating mechanism for a swingably mounted sun visor and comprising a fixedly mounted cylinder, a piston having a working fit in said cylinder, a rigid rod for the piston extending outwardly therefrom, a pivotally mounted arm operatively connected with the sun visor for transmitting movement of the arm to the sun visor for swinging the latter vertically, freely arranged inter-engaging means on said arm and the piston rod for transmitting movement of the piston to said arm, control means for the piston including a valve cylinder, a piston valve having a sliding fit in said last named cylinder, a manipulating rod rigidly connected with said piston valve inter-engaging means on said valved cylinder and said piston valve for securing the piston valve at the desired position of adjustment, a suction pipe connecting the valve cylinder with a source of suction and a second pipe connecting the valve cylinder with the first named cylinder, said valve controlling communication through said last named pipe.

MARTIN H. THODE.